Patented Nov. 13, 1945

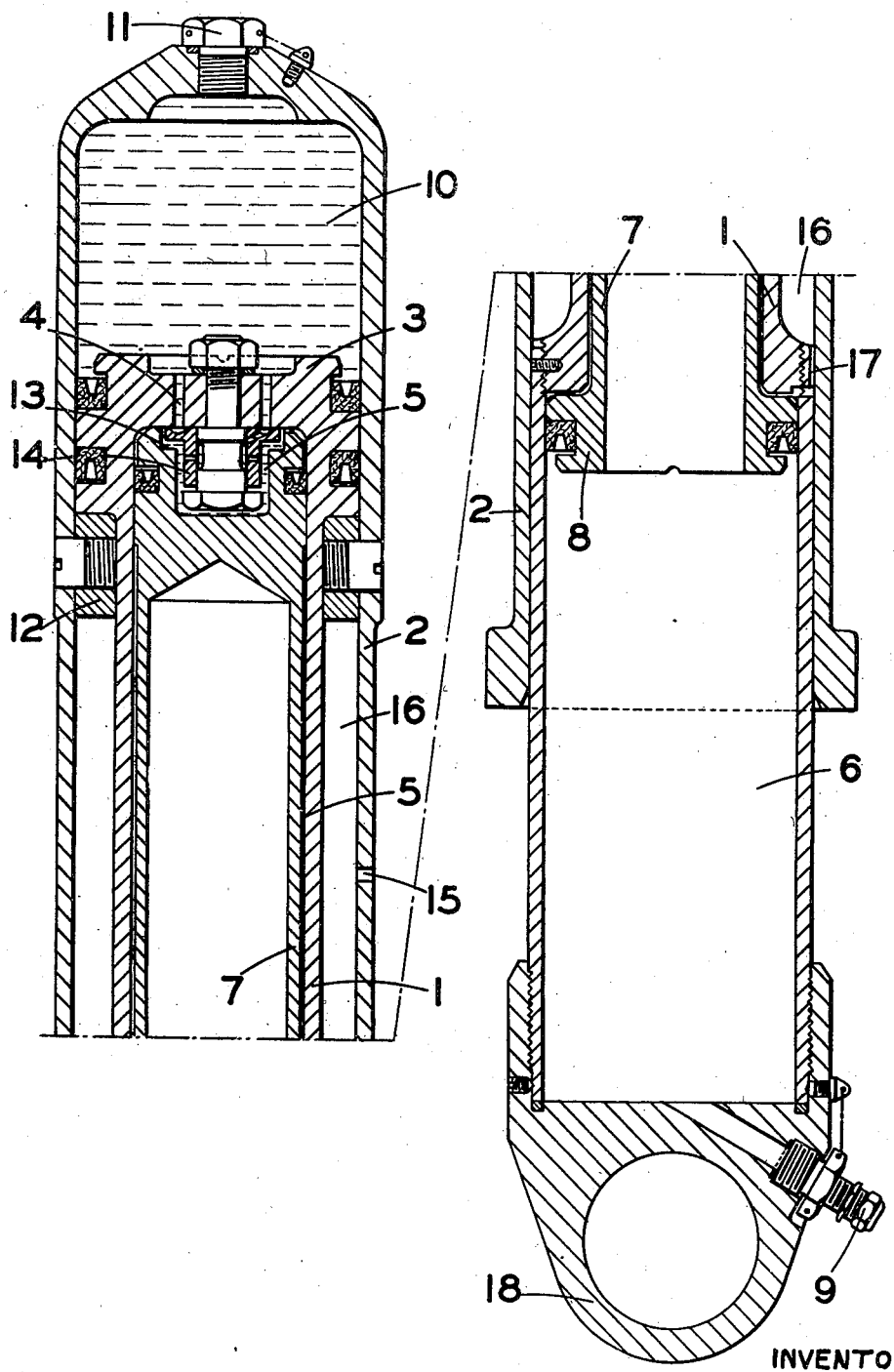

2,388,885

UNITED STATES PATENT OFFICE 2,388,885

OLEO-PNEUMATIC SHOCK ABSORBER

Cyril James Underwood, Cheltenham, England, assignor to Dowty Equipment Limited, Cheltenham, England Application June 30, 1942, Serial No. 449,057
In Great Britain February 10, 1941

6 Claims. (Cl. 267—64)

This invention relates to oleo-pneumatic shock-absorbers of the type in which a floating piston is employed to separate the gas (usually compressed air) and liquid (generally oil); and the invention consists in that the floating piston presents to the gaseous medium an area different from that which it presents to the oil.

The employment of a differential floating piston makes possible the achievement of an important object of the invention, namely: to ensure a differential of movement as between shock-absorber plunger travel and movement of the floating piston in operation of the shock-absorber.

It is an important object of the invention to provide an oleo-pneumatic shock-absorber wherein a differential floating piston operates to afford the gas or compressed air pressure virtually a mechanical advantage over the forces transmitted to the face of the piston in communication with the oil space, and thereby to afford a length of stroke to the floating piston such as to enable a low initial pressure of the gaseous medium to be employed with a cylinder of reasonably small diameter.

A further object of the invention is to provide a satisfactory form of oleo-pneumatic shock-absorber which is effective in operation, comparatively simple to produce, and easy to service.

In order that it may be clearly understood and readily carried into effect, the invention is hereinafter described with reference to the accompanying diagrammatic drawing, which is a sectional elevation taken longitudinally of a preferred form of oleo-pneumatic shock-absorber according to the invention.

Referring now to the drawing, the reference numeral 1 indicates a hollow plunger which slides within the cylinder 2. At its inner end the plunger 1 carries a suitably-glanded head 3 provided with damping ports 4. Internally of the plunger 1 and towards one end thereof is a reduced bore part 5 which terminates outwardly as a larger bore part 6 constituting an air chamber. Slidably engaging the reduced bore part 5 is the hollow stem of the differential piston 7, which has at its outer end a projecting annular flange 8 suitably glanded against leakage and fitting the enlarged bore part 6 to function as a piston. Air or other gas at pressure is introduced into the air chamber through the inflation valve 9, and oil is introduced into the oil space 10 through the filler plug 11 when the plunger is fully extended in relation to the cylinder 2, extension of the plunger being limited by the stop flange 12 fixed internally of the cylinder. Oil filling the space 10 thus communicates through the damping ports 4 with the face 13 of the differential piston 7. The orifice area of the damping ports 4 is controlled by any convenient form of clack valve, represented generally at 14, and operating in known manner to provide a lesser degree of damping during shock-absorber yield than that which prevails in rebound. The port 15 is provided through the cylinder to permit discharge of air from and entry of air to the annular space 16 in operation of the shock-absorber, and a port 17 likewise communicates between the space 16 and the back of the annulus 8.

In operation, movement of the head 3 of hollow plunger 1 into the oil space 10 causes oil to flow from it through the damping ports 4 in such head and past the clack valve into the reduced bore part 5 whereby to act upon the pressure face 13 of the differential piston 7. It will be particularly noted that the oil space 10 is of greater cross-sectional area than the reduced bore part 5, and consequently a comparatively small plunger movement will produce a relatively large movement of the differential piston 7 in the opposite direction. Again, due to the fact that the effective area which the differential piston presents to the air space is greater by the area of the annulus 8 than the area of the face 13 which is presented to the oil, the effect of the differential floating piston 7 is to give the gas pressure virtually a mechanical advantage over the forces transmitted to the face 13 of the differential floating piston through the oil, and in consequence an adequate build-up of air pressure can be achieved with a comparatively small length of plunger stroke.

The construction is of particular advantage where structural requirements necessitate a comparatively thin shock-absorber.

The oleo-pneumatic shock-absorber above described has a particular application in aircraft alighting gear of the kind in which the landing element is mounted on a lever swingable up and down under landing and taxiing loads about a pivot on a leg or equivalent fixed structure against the resilient resistance imposed by a shock-absorber connected between the leg and the lever. As shown, the cylinder is devised for housing in a tubular part at the lower end of the leg, the plunger having at its outer end the apertured lug 18 for connection by a pivoted link to the wheel mounting lever.

Although the invention is especially applicable to aircraft suspension systems, it will be understood that in some cases it may usefully be embodied in vehicle suspension systems or in any arrangement where a resilient unit is required.

What I claim is:

1. An oleo-pneumatic shock absorber comprising inner and outer tubes slidably engaged for telescoping movement, and a differential floating piston slidably engaged with said inner tube and having a larger end toward the outer end of said inner tube to define therebetween a gas containing chamber, said telescoping tubes and the smaller end of said floating piston adjacent to the inner end of said inner tube together defining a liquid containing chamber, said floating piston being movable to compress the gas in said gas containing chamber by pressure thereon of liquid in the liquid containing chamber created by inward telescoping movement of said inner and outer tubes.

2. An oleo-pneumatic telescoping shock absorber comprising a hollow member, a differential floating piston slidably engaged in said hollow member having a larger end defining with one end of said hollow member a gas containing chamber, a second member defining with the other end of said hollow member and with the smaller end of said floating piston a liquid containing chamber, said second member and said hollow member being relatively movable to exert a force on the liquid in said liquid containing chamber reacting against the smaller end of said floating piston for moving it relative to said hollow member to compress the gas in said gas containing chamber, and damping means interposed between said second member and the smaller end of said floating piston, operable to damp flow of liquid in said liquid containing chamber from one side of said damping means to the other, thereby to retard movement of said floating piston relative to said hollow member in response to unequal pressure exerted on the opposite ends of said piston by the liquid and the gas, respectively, in such chambers.

3. An oleo-pneumatic telescopic shock-absorber comprising a chamber containing liquid, a hollow plunger slidable in the chamber having a head at its inner end and a gas chamber defined by its outer end, a reduced bore extending between the head and the gas chamber of the plunger, damping ports extending through the head into communication with the reduced bore, and a differential floating piston slidably engaging the reduced bore and having at its outer end an annulus slidably engaging the gas chamber portion of said plunger, whereby to present to the gas space an effective area greater than that which is presented to the liquid in the reduced bore of the plunger.

4. An oleo-pneumatic shock-absorber as set forth in claim 3, wherein a clack valve controls the effective orifice area of the damping ports to provide a degree of damping to rebound different from that which prevails during telescopic yield of the plunger with respect to the cylinder under load.

5. An oleo-pneumatic telescopic shock-absorber comprising a chamber containing liquid, a hollow plunger slidable in the chamber having a head at its inner end and a gas chamber defined by its outer end, and having a reduced bore extending between the head and the gas chamber of the plunger and communicating with said liquid containing chamber, and a differential floating piston slidably engaging the reduced bore and having its smaller end subjected to pressure exerted upon the liquid in the liquid containing chamber and its larger end slidably engaging the gas chamber portion of said plunger, whereby to present to the gas space an effective area greater than that which is presented to the liquid.

6. An oleo-pneumatic shock-absorber comprising inner and outer tubes slidably engaged for telescoping movement to define a variable volume chamber containing liquid, said inner tube having a stepped bore therein includng one portion communicating with said variable volume chamber defined by said tubes, said portion of the tube bore being of smaller cross-sectional area than the other portion of the bore, and a differential floating piston having its smaller end slidably engaged with the portion of said inner tube bore of smaller cross-section and subjected to pressure exerted upon the liquid in the chamber defined by said tubes, and having its larger end slidably engaged in the portion of said inner tube bore of larger cross-section, said larger bore portion being closed to define with said floating piston a gas containing chamber, whereby movement of said floating piston in response to variations in the volume of the liquid containing chamber by telescoping movement of said tubes varies the volume of such gas containing bore portion of said inner tube to a greater extent than the volume of its liquid containing bore portion varies.

CYRIL JAMES UNDERWOOD.